United States Patent Office 3,056,748
Patented Oct. 2, 1962

3,056,748
PROCESS FOR BREAKING PETROLEUM OIL EMULSIONS WITH COMPLEX POLYESTER CONDENSATION PRODUCTS
Earl Theodore Kocher, Lakewood, Calif., assignor to Nalco Chemical Company, a corporation of Delaware
No Drawing. Filed Apr. 8, 1958, Ser. No. 727,056
10 Claims. (Cl. 252—342)

This invention, in general, relates to new compositions of matter and their use in the treatment of water-in-petroleum oil emulsions, such as petroleum emulsions commonly encountered in the production, handling and refining of crude mineral oil.

Petroleum emulsions are, in general, of the water-in-oil type wherein oil acts as the continuous phase for dispersal of the finely-divided particles of naturally occurring waters or brines. These emulsions are often extremely stable and will not resolve into the oil and water components even on long standing. The emulsions obtained from producing wells and from the bottom of crude oil storage tanks are commonly referred to as "cut oil," "emulsified oil," "bottom settlings" and "B.S." It is also to be understood that water-in-oil emulsions may occur artificially, resulting from any one or more of numerous operations encountered in various industries.

The emulsion breaking chemicals of this invention are particularly effective in demulsification of certain low gravity crudes and have proved to work effectively on vexacious low gravity, high viscosity crudes upon which a relatively large number of demulsifiers proved to be ineffective at economical dosages.

One type of process involves subjection emulsions of the water-in-oil type to the action of a demulsifying agent of the kind hereinafter described, thereby causing the emulsion to resolve and stratify into its component parts of oil and water or brine after emulsion has been allowed to stand in a relatively quiescent state.

One object of the invention is to provide novel and economical effective processes for resolving emulsions of the character referred to into their component parts of oil and water or brine.

Another object is to provide novel chemicals which are surface-active in order to enable their use as demulsifiers or for such uses where surface-active characteristics are necessary or desirable.

Another object is to provide novel processes for resolving naturally occurring water-in-oil emulsions in low gravity, high viscosity crudes into their component parts of oil and water. Other objects will appear hereinafter.

In accordance with the invention, the demulsifying chemicals are complex compounds prepared by esterification of mono- and polycarboxylic acids with polyhydroxy organic polymers. They are condensation reaction products of the following compounds, the percentage indicated being calculated on a weight basis and totaling 100%:

(a) 4–60% of a partial ester of a dicarboxylic acid and a terminally oxyethylated polyoxypropylene glycol, the polyoxypropylene glycol nucleus having a molecular weight in the range of 1,000 to 4,500, the ethylene oxide being adducted on said polyoxypropylene glycol in amounts in the range of 1 to 12 mols of ethylene oxide per mol of polyoxypropylene glycol, the partial ester resulting from esterification of 1 to 2 mols of dicarboxylic acid per mol of the oxyethylated polyoxypropylene glycol;
(b) 6–36% of a monocarboxylic acid having at least six carbons, preferably a monocarboxylic fatty acid having 11–18 carbons;
(c) 4–24% of a polycarboxy acid, preferably a higher molecular weight polycarboxy acid having at least eight carbons;
(d) 15–60% of an ethylene oxide adduct of an alkali-insoluble, organic-solvent-soluble alkyl phenol-formaldehyde condensation product having about 4 to 15 phenolic nuclei, said alkyl group having 5–15 carbons, inclusive, said condensation product being oxyethylated at a weight ratio of ethylene oxide to condensation product of about 2:3 to 9:1, respectively; and
(e) 15–60% of an oxyalkylated, alkali-insoluble, organic-solvent-soluble phenol-formaldehyde condensation product of a monoalkyl phenol having 4–15 phenolic nuclei, the alkyl group having between 5 and 15 carbons, inclusive, the weight ratio of alkylene oxide to condensation product falling between about 2:3 and 9:1, respectively, the phenol-formaldehyde condensation product being oxyalkylated with both ethylene oxide and propylene oxide, the weight ratio of propylene oxide to ethylene oxide being in the range of 1:9 to 9:1.

The foregoing condensation products are prepared by heating in a process kettle a mixture of the components (a) to (e) to a temperature in the range of 400° to 550° F., in an inert organic solvent such as $SO_2$ extract. The reaction is essentially one of esterification between the free carboxy groups and the free hydroxyl groups in the oxyalkylene chains. The water of reaction is distilled off and collected. The reaction is stopped short of the formation of insoluble gelatinous resins, and the solutions of the polyesters herein contemplated may range from viscosities of 100 or slightly less to several thousand centipoises.

(a) *Dicarboxy acid esters of oxyethylated polyoxypropylene glycol.*—In practicing the invention, an intermediate composition comprising the esters of a dicarboxy acid and the terminally oxyethylated polyoxypropylene glycol, the resulting ester having free carboxy groups, is first prepared by heating in an inert solvent such as $SO_2$ extract between 250° F. and 500° F. a dicarboxy acid and the oxyethylated polyoxypropylene glycol to form the partial ester. The water of reaction is distilled off and removed from the reaction zone. "Partial ester" is intended to mean an ester of the dicarboxylic acid in which some of the carboxy groups of the dicarboxylic acid remain unreacted and thus remain as free carboxy groups. This is accomplished by reacting at least one mol, preferably at least 1.5 mols, of the dicarboxy acid per mol of the oxyethylated polyoxypropylene glycol and usually not greater than about two mols. The preparation of this intermediate ester is essential in the practice of the invention. If the dicarboxy acid and the oxyethylated polyoxypropylene glycol are charged without first esterifying the two chemicals into a reaction mixture with the remaining components, the products are rubbery gels unsuitable for purposes of this invention.

The esterification process described above is continued until at least one mol of water of reaction is liberated. A convenient way to determine the termination point for the esterification is to collect and measure the water distilled from the reaction mixture. By taking into account any water introduced in the reactant chemicals, the degree of esterification can be reasonably accurately determined by the amount of water formed in the reaction and collected upon distillation.

The intermediate partial esters are preferably products which are substantially entirely dicarboxylic acid diesters of the dihydric oxyethylated polyoxypropylene glycol. They, however, may contain substantial quantities of polyesters of the two reactants of low orders of condensation and in many instances the intermediate ester may consist of both the diesters and polyesters of a low order of condensation. The formation of diesters is favored as the ratio of the mols of the dicarboxy acid per mol of oxyethylated polypropylene glycol increases. It is particularly favored where the dicarboxy acid is at least two mols per mol of glycol or where the dicarboxy acid is present in excess, such as a mol ratio of 3:1.

In other words, the intermediate should have a substantial quantity of free carboxy groups—preferably at least about one free carboxy group per mol of dicarboxy acid esterified, and, in the most preferred form of the invention, the intermediate product will consist essentially of the dicarboxylic acid diester of oxyethylated polyoxypropylene glycol, which may be illustrated by the following formula:

HOOC—R—COO—R₁—OOC—R—COOH wherein R is a bivalent organic radical, either aliphatic or aromatic, of the dicarboxy acid and R₁ is the oxyethylated polyoxypropylene glycol nucleus. In all probability, the most preferred intermediate product will also contain minor amounts of polycondensates of a low order, which polycondensates may be illustrated by the following formula:

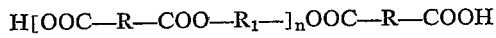

H[OOC—R—COO—R₁—]ₙOOC—R—COOH wherein R and R₁ have the significance indicated above, and $n$ is a small integer.

The acids used to prepare the above described intermediate ester are relatively low molecular weight acids such as phthalic acid, diglycolic acid, tartaric acid, maleic acid, malic acid, and like dicarboxy acids not exceeding eight carbons and in the case of the aliphatic acids, preferably not exceeding six carbons. In this instance, my purpose is to use the shorter chain aliphatic or simple aromatic dicarboxy acids to avoid reduction of the hydrophilic portions of the ultimate complex molecules by increasing the hydrophilic portions too greatly by the use of long chain dicarboxy acids such as dilinoleic acid, etc.

(b) *Monocarboxylic acids.*—Turning now to the monocarboxylic acids used as one of the reactants, these acids are used to control the degree of condensation of the ultimate, complex polyester condensate and also to provide hydrophobic or lipophilic portions to the complex molecule. They may be aliphatic acids such as caproic acid, caprylic acid, capric acid, 2-ethyl hexanoic acid, lauric acid, myristic acid, myristoleic acid, palmitic acid, palmitoleic acid, stearic acid, oleic acid, linoleic acid, linolenic acid, arachidic acid, behenic acid or mixtures thereof; resin acids such as abietic acid and the like; or aryl monocarboxylic acids such as naphthenic acid, or even mixtures of these classes of acids such as the mixture of fatty acids and resin acids in tall oil. In most instances, monocarboxylic acids having 11–24 carbons are preferred.

(c) *Polycarboxy acids.*—The polycarboxy acids employed as one of the reactants also contribute hydrophobic portions to the ultimate, complex molecule. To this end, the polycarboxy acids should have at least eight carbons. They may be such polycarboxy acids as suberic acid, azelaic acid, or polycarboxy polymer acids such as those obtained as by-products or those obtained by polymerizing a drying oil monocarboxylic acid in dimerized and trimerized form. Examples of such polymerized acids are Emery's dimer acid and VR-1 acid.

Emery dimer acid is essentially dilinoleic acid and is a polymer made by polymerizing an unsaturated fatty acid containing at least two nonconjugated double bonds. Such acids may also be described as polymerized drying oil acids. The term "drying oil acid" is used herein to mean an unsaturated monocarboxylic fatty acid containing at least two double bonds and at least six carbon atoms. The polymer acids employed for the purpose of the invention preferably consist predominantly of dimer acids but may contain trimers and higher polymers. The preferred polymer acids are those containing 12 to 40 carbon atoms and especially the polymers of the drying oil acids of the linoleic acid series, including, for example, the polymers of sorbic acid, geranic acid, palmitolic acid, linoleic acid and humoceric acid. It will be understood that these polymers may include cogeneric mixtures of polycarboxy acids.

A number of these polymer acids are available as by-product materials. Thus, one source of the polymeric acids suitable for the purposes of this invention is the still residue of the dry distillation of castor oil in the presence of sodium hydroxide. VR-1 acid is an acid of this type.

VR-1 acid is a mixture of polybasic acids, with an average molecular weight of about 1,000. It has an average of slightly more than two carboxylic acid groups per molecule. It is a by-product acid, and is a dark amber, rather viscous liquid. A typical sample of VR-1 acid gave the following analysis:

| | |
|---|---|
| Acid number | 150 |
| Iodine number | 36 |
| Saponification number | 172 |
| Unsaponifiable matter, percent | 3.7 |
| Moisture content, percent | 0.86 |

Alternatively, there may be used a commercial product containing both the monocarboxylic acid and the dicarboxylic acid. An example of a product containing both the monocarboxylic acid and the polycarboxy acids is a product marketed by the Hardesty Division of Wallace & Tiernan under the name Roleic Acid. Roleic Acid is reported to comprise about 60% by weight of monobasic acids, chiefly myristic and oleic acids, and 40% by weight of polybasic acids, principally fatty dimer acids. The product has a titer of 24° to 28° C., an iodine value of 40–50, free fatty acid value, as oleic acid, of 100–105, an acid number of 201–210, and less than 1% unsaponifiables.

(d) *Ethylene oxide adducts of phenol-formaldehyde resins.*—The phenol-formaldehyde resins are the alkali-insoluble, organic-solvent-soluble reaction products of formaldehyde with a monoalkyl phenol, the alkyl group having between 5–15 carbons inclusive. Dialkyl phenols are not suitable for compositions of this invention, but amounts up to 25% dialkyl phenol in the monoalkyl phenol reactant may be tolerated. The weight ratio of ethylene oxide to the phenol-formaldehyde condensation product will, for most applications, fall between about 2:3 and 9:1, respectively, preferably the range of 2:3 to 2:1. It is also possible to use in a similar manner in this intermediate product, instead of solely ethylene oxide, both propylene oxide and ethylene oxide wherein the oxides are added sequentially—the 1,2-propylene oxide being added to the resin first and the ethylene oxide being added to the oxypropylene groups. The ethylene oxide will be at least 1 part by weight per 40 parts of propylene oxide adducted.

In this manner, the terminal oxyalkylation groups are those of oxyethylene, which have primary hydroxyl groups. Primary hydroxyl groups are easier to esterify than secondary hydroxyl groups resulting from 1,2-propylene oxide.

*Phenol-Formaldehyde Condensation*

The phenol-formaldehyde condensation products are prepared by reacting formaldehyde or a substance which breaks down to formaldehyde under the reaction conditions, e.g., paraformaldehyde and trioxane, and a monoalkyl phenol, preferably crude alkylated phenol for economic reasons, by heating the reactants in the presence of a small amount of an acid catalyst such as sulfamic acid or hydrochloric acid under substantially anhydrous conditions—excepting the water produced during the reaction. The aqueous distillate which begins to form is collected and removed from the reaction mixture. After several hours of heating at temperatures slightly above the boiling point of water, the mass becomes viscous and is permitted to cool to about 100° to 105° C. At this point a suitable hydrocarbon fraction is added, and heating is resumed. Further aqueous distillate begins to form and heating is continued for an additional number of hours until at least about one mol of aqueous distillate per mol of reactants has been secured. The product is permitted to cool to yield the phenol-formaldehyde condensation product in a hydrocarbon solvent. The molecular weight of these intermediate condensation products cannot be ascertained with certainty, but we would approximate that the resins employed herein should contain about 4 to 15, preferably 4 to 10, phenolic nuclei per resin molecule. The solubility of the condensation product in hydrocarbon solvent would indicate that the resin is a linear type polymer, thus distinguishing them from the more common phenol-formaldehyde resins of the cross linked type.

This aspect of the invention is illustrated in the following examples but is not limited thereto. The parts are by weight.

EXAMPLE A

In a three-necked reaction flask provided with means of mechanical stirring and a return condenser system permitting the removal of any aqueous phase formed in the course of reaction, there is added 1500 parts of a crude alkylate phenol which comprises an undistilled nonyl phenol containing approximately 10% of dinonylphenol, 225 parts paraformaldehyde and 3 parts sulfamic acid which is present at a catalyst in the reaction. The reaction mass is heated, and at 108° C. an aqueous distillate begins to form. After three hours heating at approximately 110° C. the mass becomes quite viscous and is permitted to cool to about 100° C. At this point 600 parts of $SO_2$ extract is added, and heating is resumed. Again at 110° C. further aqueous distillate begins to form, and heating is continued for an additional three hours, or until approximately 141 parts of aqueous distillate has been secured at a maximum temperature of 212° C. The product is permitted to cool to yield the finished phenol-formaldehyde resin solution in hydrocarbon solvent.

EXAMPLE B

In a manner similar to Example A, 1000 parts of the crude alkylate phenol, 120 parts of paraformaldehyde and 2 parts sulfamic acid are heated 2 hours at 105 to 110° C. to permit reaction of the phenol and formaldehyde under conditions minimizing formaldehyde loss. At temperatures above 110° C. vigorous reaction sets in which must be controlled by cooling. After about 27 parts of aqueous distillate have been secured, the reaction comes under control and becomes exceedingly viscous. At this point the resin is cooled to 105° C., and 400 parts of $SO_2$ extract are added. Heating is continued for an additional three hours, or until a total of about 75 parts of aqueous distillate have been removed at maximum temperature of 212° C. to yield the finished phenol-formaldehyde resin solution in hydrocarbon solvent.

EXAMPLE C

In a manner similar to Examples A and B, 1000 parts of the crude alkylate phenol, 90 parts paraformaldehyde and 2 parts sulfamic acid are carefully reacted at temperatures of 100 to 110° C. When the reaction mass becomes quite viscous, the reaction is permitted to cool, and 400 parts of $SO_2$ extract are added. Heating is resumed for an additional hour, or until a total of 55 parts of aqueous distillate have been secured at maximum temperature of 213° C. to yield the finished phenol-formaldehyde resin solution in hydrocarbon solvent.

In the preceding examples, sulfamic acid has been used as the acid catalyst to assist in the condensation reaction. Other suitable equivalent acids which may be used in place of sulfamic acid are mineral acids such as sulfuric acid, hydrochloric acid, phosphoric acid, etc.

The preparation of a phenol-formaldehyde resin wherein the catalyst is hydrochloric acid is illustrated in the following example.

EXAMPLE D

Six thousand parts of the crude alkylated phenol of Example A, 900 parts of paraformaldehyde, and 45 parts of 35% hydrochloric acid are heated to 65 to 70° C. The heating is reduced, and a temperature of 100° C. is approached slowly because the exothermic reaction may be sufficient to raise the temperature to 100° C. without external heating.

The reaction mixture is held at 95 to 100° C. for three hours. The temperature is slowly raised to about 115° C., at which point 2400 parts of $SO_2$ extract are added. The heating is continued slowly until a temperature of 210° C. is reached. The product is then cooled to yield the phenol-formaldehyde resin solution.

As stated heretofore, intermediate phenol-formaldehyde resin should contain a minimum of about 4 phenolic nuclei and should not exceed about 15 phenolic nuclei. It is extremely difficult, if not impossible, to accurately determine the molecular weight of the intermediate resin products. However, it is believed that the resin of Example A contains about 10 phenolic nuclei per resin molecule, Example B, about 7 phenolic nuclei, and Example C, about 4 phenolic nuclei per resin molecule.

Oxyalkylation of the Condensation Products

Having prepared the intermediate phenol-formaldehyde products, the next step is the oxyalkylation of the condensation products. This is achieved by mixing the intermediate phenol-formaldehyde condensation product in a hydrocarbon solvent with a small amount of sodium hydroxide in an autoclave. The condensation product is heated above 100° C., and ethylene oxide, or first the propylene oxide until it is completely reacted and then the ethylene oxide, is charged into the autoclave until the pressure is in the vicinity of 75 to 100 p.s.i.

The reaction mixture is gradually heated until an exothermic reaction begins. The external heating is then removed and alkylene oxide is added as such a rate that the temperature is maintained between about 150 to 160° C. in a pressure range of 80 to 100 p.s.i. After all of the alkylene oxide has been added, the temperature is maintained for an additional 10 to 20 minutes to assure substantially complete reaction of the alkylene oxide. The resulting product is the alkylene oxide adduct of an alkyl phenol-formaldehyde condensation product, in which the weight ratio of the oxide to the condensation product is between about 2:3 and 9:1, respectively, or even slightly higher. The molecular weight of the oxyalkylated phenol-formaldehyde condensation products of this invention range from as low as about 1100 to as high as about 50,000.

Some preferred embodiments of the oxyalkylated, alkyl phenol-formaldehyde condensation products and methods of their preparation are illustrated in the following examples wherein all parts are by weight unless otherwise stated, but the invention is not limited thereto.

EXAMPLE E

In an autoclave having a two-liter capacity equipped with a means of external electric heating, internal cooling coils and mechanical agitation, there is charged 950 parts of the resin solution of Example A, and 1.5 parts of sodium hydroxide. Into a transfer bomb there is introduced 575 parts ethylene oxide. The resin is heated to 135° C., and the ethylene oxide is charged into the reactor until reactor pressure is 80 p.s.i. The reaction mixture is gradually heated until an exothermic rection begins to take place. The external heating is then removed and ethylene oxide is then added at such a rate that the temperature is maintained between 150 to 160° C. with a pressure range of 80 to 100 p.s.i. After approximately two hours all of the oxide has been added to the autoclave, and the temperature is maintained for an additional 15 minutes to make certain that the unreacted oxide is reduced to a minimum. The resulting product is the ethylene oxide adduct of a phenol-formaldehyde resin, in which the weight ratio of oxide to resin by weight is 2 to 3. The oxyalkylated phenol-formaldehyde condensation product had a hydroxyl equivalent weight of about 620 and contained about ten oxyalkylene chains per resin molecule.

EXAMPLE F

In a manner similar to Example E, the ethylene oxide adduct of the resin of Example B was prepared in which the ratio of ethylene oxide to resin was 1½ to 1 by weight. The oxyalkylated phenol-formaldehyde condensation product had a hydroxyl equivalent weight of about 840 and contained about four oxyalkylene chains per resin molecule.

EXAMPLE G

In a manner similar to Example E there is prepared a propylene oxide adduct of the resin of Example A in which the ratio of propylene oxide to resin by weight is 1 to 1. The oxypropylated phenol-formaldehyde resin was then reacted further with ethylene oxide until the finished product contained 10% by weight of ethylene oxide. The oxyalklylated phenol-formaldehyde condensation product had a hydroxyl equivalent weight of about 750 and contained about ten oxyalkylene chains per resin molecule.

EXAMPLE H

In a manner similar to Example G a propylene oxide adduct of the resin of Example C was prepared in which the ratio of propylene oxide to resin was 6 to 1 by weight. Ethylene oxide was then added to this oxypropylated phenol-formaldehyde resin until the finished product contained 20% by weight of ethylene oxide. The oxyalkylated phenol-formaldehyde condensation product had a hydroxyl equivalent weight of about 1200 and contained about four oxyalkylene chains per resin molecule.

EXAMPLE J

In a manner similar to Example G a propylene oxide adduct of the resin of Example A was prepared in which the ratio of propylene oxide to resin was 9 to 1 by weight. This oxypropylated phenol-formaldehyde resin was then further reacted with ethylene oxide until the finished material contained 5% by weight of ethylene oxide. The oxyalkylated phenol-formaldehyde condensation product had a hydroxyl equivalent weight of about 1400 and contained about ten oxyalkylene chains per resin molecule.

EXAMPLE K

In a manner similar to Example G a propylene oxide adduct of the resin of Example C was prepared in which the ratio of propylene oxide to resin was 2 to 1 by weight. This oxypropylated phenol-formaldehyde resin was then further reacted with ethylene oxide until the finished material contained 30% by weight of ethylene oxide. The oxyalkylated phenol-formaldehyde condensation product had a hydroxyl equivalent weight of about 1200 and contained about four oxyalkylene chains per resin molecule.

*Mixed Alkylene Oxide Adducts of Organic-Solvent-Soluble Phenol-Formaldehyde Resins*

The phenol-formaldehyde resins in the intermediate products constituting mixed oxyethylated and oxypropylated phenol-formaldehyde resins are prepared in the same manner as the resins described in the previous section, and reference is made thereto.

The weight ratio of alkylene oxide to the phenol-formaldehyde condensation product will, for most applications, fall between about 2:3 and 9:1, or even slightly higher, respectively. The alkylene oxides are ethylene oxide and propylene oxide and are added as mixtures. The weight ratio of ethylene oxide to propylene oxide ranges from 4:1 to 1:4.

The oxyalkylation of the phenol-formaldehyde condensation products is achieved by mixing the intermediate phenol-formaldehyde condensation product in a hydrocarbon solvent with a small amount of sodium hydroxide in an autoclave. The condensation product is heated above 100° C., and a mixture of ethylene oxide and propylene oxide is charged into the autoclave until the pressure is in the vicinity of 75 to 100 p.s.i.

The reaction mixture is gradually heated until an exothermic reaction begins. The external heating is then removed, and alkylene oxide mixture is added at such a rate that the temperature is maintained between about 150 to 160° C. in a pressure range of 80 to 100 p.s.i. After all of the alkylene oxide mixture has been added, the temperature is maintained for an additional 10 to 20 minutes to assure substantially complete reaction of the alkylene oxide. The resulting product is the mixed alkylene oxide adduct of an alkyl phenol-formaldehyde condensation product, in which the weight ratio of the oxide to the condensation product is between about 2:3 and 9:1, respectively, or even slightly higher. The molecular weight of the oxyalkylated phenol-formaldehyde condensation products of this invention range from as low as about 1100 to as high as about 50,000.

Some preferred embodiments of the oxyalkylated, alkyl phenol-formaldehyde condensation products and methods of their preparation are illustrated in the following examples wherein all parts are by weight unless otherwise stated, but the invention is not limited thereto.

EXAMPLE L

In an autoclave having a two-liter capacity equipped with means of external electrical heating, internal cooling coils and mechanical agitation, there is charged 18 parts of the resin solution of Example B and 1.5 parts of sodium hydroxide. Into a transfer bomb there is introduced 23 parts of mixed oxides prepared by mixing equal parts of ethylene and propylene oxide by weight. The intermediate is heated to 135° C. and the oxide mixture is charged into the reactor until reactor pressure is 80 p.s.i. The reaction mixutre is gradually heated until an exothermic reaction begins to take place. The external heating is removed and the mixed oxides are then added at such a rate that the temperature is maintained between 150 to 160° C. with a pressure range of 80 to 100 p.s.i. At various stages in the reaction small samples of the reaction product were removed. After approximately 2 hours all of the oxide has been added to the autoclave and the temperature is maintained for an additional period of time so that the reactor pressure drops to a constant value. This may require from 15 minutes to 2 hours to make certain that the unreacted oxide is reduced to a minimum. The resultant product is the mixed oxide adduct of a phenol-formaldehyde resin in which the ratio of oxide to resin by weight is 4 to 1.

EXAMPLE M

In a manner similar to Example L a mixed oxide adduct of the resin of Example A was prepared in which the ratio of ethylene oxide to propylene oxide was 1 part to 2 parts. The finished product is an oxyalkylated resin in which the ratio of mixed oxides to resin is 4 to 1.

EXAMPLE N

In the same facilities as used in Example L, there is charged 172 parts of the resin solution of Example A and 1 part of sodium hydroxide. Into a transfer bomb there is introduced 250 parts by weight of ethylene oxide and 250 parts of propylene oxide. The intermediate is heated to 135° C. and the mixed oxides are charged into the reactor until the reactor pressure is 80 p.s.i. The reaction conditions from here on were identical with those employed in Example L. The resulting product is the mixed oxide adduct of a phenol-formaldehyde resin in which the ratio of oxide to resin by weight is approximately 4 to 1.

EXAMPLE O

In a manner similar to Example N, using a 1 to 1 by weight ratio of ethylene oxide and propylene oxide, a mixed oxide adduct of the resin of Example C was prepared in which the ratio of oxide to resin was 6 to 1.

EXAMPLE P

In a manner similar to Example N, using a 1 to 3 by weight ratio of ethylene oxide to propylene oxide, a mixed oxide adduct of the resin of Example C was prepared in which the ratio of oxide to resin was 6 to 1.

EXAMPLE Q

In a manner similar to Example N, using a 1 to 3 by weight ratio of ethylene oxide to propylene oxide, a mixed oxide adduct of the resin of Example B was prepared in which the ratio of oxide to resin was 2 to 1.

EXAMPLE R

In a manner similar to Example N, using a 3 to 1 by weight of ethylene oxide to propylene oxide, a mixed oxide adduct of the resin of Example A was prepared in which the ratio of oxide to resin was 1 to 1.

EXAMPLE S

In an autoclave equipped with external heating means, internal cooling coils and a mechanical agitator, there is charged 1750 parts of the resin solution of Example D and 7 parts of flake caustic. Into a charge vessel are pumped 3500 parts of ethylene oxide and 3500 parts of propylene oxide, which are intimately mixed by recirculating the oxirane gases through a recirculating pump for two hours. The autoclave is purged with natural gas, and heating is begun. At 140° C., the mixed oxides are added until the pressure reaches 40 p.s.i. The addition is stopped at this point, and as the mixture is gradually heated, an exothermic reaction begins. The external heating is discontinued, and the remaining mixed oxides are added at a rate to maintain the temperature between 150° and 160° C. When all of the mixed oxides have been added to the autoclave, the contents of the autoclave are recycled for two hours at 150° to 160° C. The product is then cooled. The resultant product is the mixed oxide adduct of a phenol-formaldehyde resin in which the ratio of oxide to resin by weight is 4:1.

The hydrocarbon fraction in the foregoing examples is sulfur dioxide extract. This material is a by-product from the Edeleanu process of refining petroleum in which the undesirable fractions are removed by extraction with liquid sulfur dioxide. After removal of the sulfur dioxide a mixture of hydrocarbons is substantially aromatic in character, remains and is designated in the trade as sulfur dioxide extract or $SO_2$ extract. Examples of other suitable hydrocarbon vehicles are toluene, xylene, gas oil, diesel fuel, bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

Surface Active Complex Polyesters

The following examples are illustrative of the complex polyesters which are surface active and are particularly useful as demulsifiers. Unless otherwise indicated, the parts are by weight.

EXAMPLE 1

Nine thousand pounds of a terminally oxethylated polyoxypropyleene glycol (6 mols ethylene oxide per mol of polyoxypropylene glycol, the latter having a molecular weight of about 2700) and 220 gallons of $SO_2$ extract are charged into a process kettle equipped with a stirrer and heated to 300° F. Then, the 1200 pounds of diglycolic acid are added. The mixture is heated slowly and uniformly, and the water of reaction is distilled off and collected until 18 gallons of water have been distilled off. This requires about four hours. The final temperature rises to about 500° F. The mixture is then cooled, and 220 gallons of $SO_2$ extract are added. The product is then drummed without delay.

Two drums (about 900 lbs.) of the foregoing product, 1400 pounds of roleic acid, described supra, 1800 pounds of the product of Example E, 1800 pounds of the product of Example S, and 330 gallons of $SO_2$ extract are charged into a process kettle. The mixture is heated slowly with the distillation of water until 12 gallons of water have been distilled off. This takes about five hours, and the final temperature is in the range of 480° to 500° F. The product becomes viscous toward the end of the reaction, and care is exercised to avoid gelation.

When twelve gallons of water have distilled off, the product is cooled quickly by dropping it into a thinning kettle, and 330 gallons of $SO_2$ extract are added. The warm product is pumped to storage and allowed to settle while cooling.

FURTHER EXAMPLES

Other examples of compositions contemplated by this invention and their preparation are outlined in the following table. The preparatory technique of Example 1 was followed in each instance, and the parts are reported on a weight basis:

| Components | Parts in Formulation Example | | | | | | | |
|---|---|---|---|---|---|---|---|---|
| | 2 | 3 | 4 | 5 | 6 | 7 | 8 | 9 |
| Composition A | 150 | 100 | 100 | 100 | 50 | 50 | 20 | 20 |
| Crude Roleic Acid | 50 | 100 | 100 | 100 | 150 | 150 | 200 | 200 |
| Example E | 150 | 225 | 150 | 75 | 75 | 150 | 150 | 180 |
| Example S | 150 | 75 | 150 | 225 | 225 | 150 | 150 | 120 |
| $SO_2$ extract | 200 | 200 | 200 | 200 | 200 | 200 | 200 | 200 |
| Aqueous distillate | 5.2 | 8.0 | 7.6 | 7.8 | 6.0 | 6.2 | 6.4 | 7.0 |
| Initial temp. of distillation, ° C | 196 | 164 | 163 | 187 | 192 | 197 | 188 | 190 |
| Final temp., ° C | 245 | 255 | 253 | 262 | 246 | 257 | 261 | 261 |
| Reaction time, hrs | 4 | 4¾ | 4½ | 4½ | 5 | 5 | 4 | 4 |
| $SO_2$ extract added at end of reaction | 200 | 150 | 150 | 150 | 150 | 200 | 150 | 150 |

Composition A in the above table is the diglycolic acid ester of the oxyethylated polyoxypropylene glycol described in Example 1.

Demulsification

The compositions of this invention are surface-active and are particularly suitable for demulsification of crude oil emulsions. Demulsification is achieved by mixing the demulsifying chemicals of this invention with the crude oil emulsion at a weight ratio of one part of the active chemical to 1000 to 50,000 parts of the emulsion, and thereafter allowing the emulsion to remain in a relatively quiescent state during which separation of the water or brine and oil occurs. While the invention herein disclosed is not limited thereto, the demulsifiers of this invention have been particularly successful, as compared with known demulsifiers, in the treatment of low gravity, high viscosity crude oils which are generally treated in the upper portion of the 150° to 200° F. treating temperature range. These low gravity crudes are predominantly asphaltic base oils, containing appreciable amounts of asphaltenes, asphaltanes, bitumen, and pyrolitic residuum.

For example, treatment of low gravity crudes from California (12–13 API) with the chemical of Example 1 was successful at dosages of almost 40% in one instance, and 50% in another instance, less than the competitive chemical used commercially with these crudes. Improvements in water clarity were also noted—the water released by treatment with the chemical of Example 1 being crystal clear whereas the water released by treatment with the competitive chemical had been turbid. Also, settling time (the period of relative quiescence) was reduced from 36 hours to 18 hours.

The invention is hereby claimed as follows:

1. In a process for breaking petroleum oil emulsions of the water-in-oil type, adding to said emulsion a sufficient quantity to break the emulsion into its water and petroleum components of a surface-active, polyetser condensation product of the following compounds, the percentages enumerated being calculated on a weight basis and totaling 100%: (a) 4–60% of a partial ester of a dicarboxylic acid and a terminally oxyethylated polyoxypropylene glycol, the polyoxypropylene glycol nucleus having a molecular weight in the range of 1,000 to 4,500, the ethylene oxide being adducted on said polyoxypropylene glycol in amounts in the range of 1 to 12 mols of ethylene oxide per mol of polyoxypropylene glycol, the partial ester resulting from esterification of 1 to 2 mols of dicarboxylic acid per mol of the oxyethylated polyoxypropylene glycol; (b) 6–36% of a monocarboxylic acid having at least six carbons; (c) 4–24% of a polycarboxy acid having at least eight carbons; (d) 15–60% of an ethylene oxide adduct of an alkali-insoluble, organic-solvent-soluble alkyl phenol-formaldehyde condensation product having about 4 to 15 phenolic nuclei, said alkyl group having 5–15 carbons, inclusive, said condensation product being oxyethylated at a weight ratio of ethylene oxide to condensation product of about 2:3 to 9:1, respectively; and (e) 15–60% of an oxyalkylated, alkali-insoluble, organic-solvent-soluble phenol-formaldehyde condensation product of a monoalkyl phenol having 4–15 phenolic nuclei, the alkyl group having between 5 and 15 carbons, inclusive, the weight ratio of alkylene oxide to condensation product falling between about 2:3 and 9:1, respectively, the phenol-formaldehyde condensation product being oxyalkylated with both ethylene oxide and propylene oxide, the weight ratio of propylene oxide to ethylene oxide being in the range of 1:9 to 9:1; and thereafter separating the water from the petroleum oil.

2. In a process for breaking petroleum oil emulsions of the water-in-oil type, adding to said emulsion a sufficient quantity to break the emulsion into its water and petroleum components of a surface active, polyester condensation product of the following compounds, the percentages enumerated being calculated on a weight basis and totaling 100%: (a) 4–60% of a partial ester of a dicarboxylic acid and a terminally oxyethylated polyoxypropylene glycol, the polyoxypropylene glycol nucleus having a molecular weight in the range of 1,000 to 4,500, the ethylene oxide being adducted on said polyoxypropylene glycol in amounts in the range of 1 to 12 mols of ethylene oxide per mol of polyoxypropylene glycol, the partial ester resulting from esterification of 1 to 2 mols of dicarboxylic acid per mol of the oxyethylated polyoxypropylene glycol; (b) a monocarboxylic acid having 11 to 18 carbons; (c) a dicarboxylic fatty dimer acid having 12 to 40 carbons; (d) 15–60% of an ethylene oxide adduct of an alkali-insoluble, organic-solvent-soluble alkyl phenol-formaldehyde condensation product having about 4 to 15 phenolic nuclei, said alkyl group having 5–15 carbons, inclusive, said condensation product being oxyethylated at a weight ratio of ethylene oxide to condensation product of about 2:3 to 9:1, respectively; and (e) 15–60% of an oxyalkylated, alkali-insoluble, organic-solvent-soluble phenol-formaldehyde condensation product of a monoalkyl phenol having 4–15 phenolic nuclei, the alkyl group having between 5 and 15 carbons, inclusive, the weight ratio of alkylene oxide to condensation product falling between about 2:3 and 9:1, respectively, the phenol-formaldehyde condensation product being oxyalkylated with both ethylene oxide and propylene oxide, the weight ratio of propylene oxide to ethylene oxide being in the range of 1:9 to 9:1; and thereafter separating the water from the petroleum oil.

3. In a process for breaking petroleum oil emulsions of the water-in-oil type, adding to said emulsion a sufficient quantity to break the emulsion into its water and petroleum components of a surface-active, polyester condensation product of the following compounds, the percentages enumerated being calculated on a weight basis and totaling 100%: (a) 4–60% of a partial ester of a dicarboxylic acid and a terminally oxyethylated polyoxypropylene glycol, the polyoxypropylene glycol nucleus having a molecular weight in the range of 1,000 to 4,500, the ethylene oxide being adducted on said polyoxypropylene glycol in amounts in the range of 1 to 12 mols of ethylene oxide per mol of polyoxypropylene glycol, the partial ester resulting from esterification of 1 to 2 mols of dicarboxylic acid per mol of the oxyethylated polyoxypropylene glycol; (b) 6–36% of a monocarboxylic acid having at least six carbons; (c) 4–24% of a polycarboxy acid having at least eight carbons; (d) 15–60% of an alkylene oxide adduct containing terminal oxyethylene groups of an alkali-insoluble, organic-solvent-soluble alkyl phenol-formaldehyde condensation product having about 4 to 15 phenolic nuclei, said alkyl group having 5–15 carbons, inclusive, said condensation product being oxyalkylated with alkylene oxides from the group consisting of ethylene oxide and both ethylene oxide and propylene oxide, in the latter instance the order of oxyalkylation being oxypropylation of the condensation product followed by oxyethylation of the oxypropylated condensation product, at a weight ratio of total oxides to condensation product of about 2:3 to 9:1, respectively; and (e) 15–60% of an oxyalkylated, alkali-insoluble, organic-solvent-soluble phenol-formaldehyde condensation product of a monoalkyl phenol having 4–15 phenolic nuclei, the alkyl group having between 5 and 15 carbons, inclusive, the weight ratio of alkylene oxide to condensation product falling between about 2:3 and 9:1 respectively, the phenol-formaldehyde condensation product being oxyalkylated with a premixture of ethylene oxide and propylene oxide, the weight ratio of propylene oxide to ethylene oxide being in the range of 1:9 to 9:1; and thereafter separating the water from the petroleum oil.

4. In a process for breaking petroleum oil emulsions of the water-in-oil type, adding to said emulsion a sufficient quantity to break the emulsion into its water and petroleum components of a surface active, polyester condensation product of the following compounds, the percentages enumerated being calculated on a weight basis and totaling 100%: (a) 4–60% of a partial ester of a dicarboxylic acid and a terminally oxyethylated polyoxypropylene glycol, the polyoxypropylene glycol nucleus having a molecular weight in the range of 1,000 to 4,500, the ethylene oxide being adducted on said polyoxypropylene glycol in amounts in the range of 1 to 12 mols of ethylene oxide per mol of polyoxypropylene glycol, the partial ester resulting from esterification of 1 to 2 mols of dicarboxylic acid per mol of the oxyethylated polyoxypropylene glycol; (b) a monocarboxylic acid having 11 to 18 carbons; (c) a dicarboxylic fatty dimer acid having 12 to 40 carbons; (d) 15–60% of an alkylene oxide adduct containing terminal oxyethylene groups of an alkali-insoluble, organic-solvent-soluble alkyl phenol-formaldehyde condensation product having about 4 to 15 phenolic nuclei, said alkyl group having 5–15 carbons, inclusive, said condensation product being oxyalkylated with alkylene oxides from the group consisting of ethylene oxide and both ethylene oxide and propylene oxide, in the latter instance the order of oxyalkylation being oxypropylation of the condensation product followed by oxyethylation of the oxypropylated condensation product, at a weight ratio of total oxides to condensation product of about 2:3 to 9:1, respectively; and (e) 15–60% of an oxyalkylated, alkali-insoluble, organic-solvent-soluble phenol-formaldehyde condensation product of a monoalkyl phenol having 4–15 phenolic nuclei, the alkyl group having between 5 and 15 carbons, inclusive, the weight ratio of alkylene oxide to condensation product falling between about 2:3 and 9:1, respectively, the phenol-formaldehyde condensation product being oxyalkylated with a premixture of ethylene oxide and propylene oxide, the weight ratio of propylene oxide to ethylene oxide being in the range of 1:9 to 9:1; and thereafter separating the water from the petroleum oil.

5. In a process for breaking petroleum oil emulsions, adding to a water-in-petroleum oil emulsion, the petroleum oil being a low gravity, high viscosity crude which is predominantly asphaltic base oils, a sufficient quantity to break the emulsion into its water and petroleum components of a surface-active, polyester condensation product of the following compounds, the percentages enumerated being calculated on a weight basis and totaling 100%: (a) 4–60% of a partial ester of a dicarboxylic acid and a terminally oxyethylated polyoxypropylene glycol, the polyoxypropylene glycol nucleus having a molecular weight in the range of 1,000 to 4,500, the ethylene oxide being adducted on said polyoxypropylene glycol in amounts in the range of 1 to 12 mols of ethylene oxide per mol of polyoxypropylene glycol, the partial ester resulting from esterification of 1 to 2 mols of dicarboxylic acid per mol of the oxyethylated polyoxypropylene glycol; (b) 6–36% of a monocarboxylic acid having at least six carbons; (c) 4–24% of a polycarboxy acid having at least eight carbons; (d) 15–60% of alkylene oxide adduct containing terminal oxyethylene groups of an alkali-insoluble, organic-solvent-soluble alkyl phenol-formaldehyde condensation product having about 4 to 15 phenolic nuclei, said alkyl group having 5–15 carbons, inclusive, said condensation product being oxyalkylated with alkylene oxides from the group consisting of ethylene oxide and both ethylene oxide and propylene oxide, in the latter instance the order of oxyalkylation being oxypropylation of the condensation product followed by oxyethylation of the oxypropylated condensation product, at a weight ratio of total oxides to condensation product of about 2:3 to 9:1, respectively; and (e) 15–60% of an oxyalkylated, alkali-insoluble, organic-solvent-soluble phenol-formaldehyde condensation product of a monoalkyl phenol having 4–15 phenolic nuclei, the alkyl group having between 5 and 15 carbons, inclusive, the weight ratio of alkylene oxide to condensation product falling between about 2:3 and 9:1, respectively, the phenol-formaldehyde condensation product being oxyalkylated with a premixture of ethylene oxide and propylene oxide, the weight ratio of propylene oxide to ethylene oxide being in the range of 1:9 to 9:1; and thereafter separating the water and the petroleum oil.

6. In a process for breaking petroleum oil emulsions, adding to a water-in-petroleum oil emulsion, the petroleum oil being a low gravity, high viscosity crude which is predominantly asphaltic base oils, a sufficient quantity to break the emulsion into its water and petroleum components of a surface active, polyester condensation product of the following compounds, the percentages enumerated being calculated on a weight basis and totaling 100%: (a) 4–60% of a partial ester of dicarboxylic acid and a terminally oxyethylated polyoxypropylene glycol, the polyoxypropylene glycol nucleus having a molecular weight in the range of 1,000 to 4.500, the ethylene oxide being adducted on said polyoxypropylene glycol in amounts in the range of 1 to 12 mols of ethylene oxide per mol of polyoxypropylene glycol, the partial ester resulting from esterification of 1 to 2 mols of dicarboxylic acid per mol of the oxyethylated polyoxypropylene glycol; (b) a monocarboxylic acid having 11 to 18 carbons; (c) a dicarboxylic fatty dimer acid having 12 to 40 carbons; (d) 15–60% of an ethylene oxide adduct of an alkali-insoluble, organic-solvent-soluble alkyl phenol-formaldehyde condensation product having about 4 to 15 phenolic nuclei, said alkyl group having 5–15 carbons, inclusive, said condensation product being oxyethylated at a weight ratio of ethylene oxide to condensation product of about 2:3 to 9:1, respectively; and (e) 15–60% of an oxyalkylated, alkali-insoluble, organic-solvent-soluble phenol-formaldehyde condensation product of a monoalkyl phenol having 4–15 phenolic nuclei, the alkyl group having between 5 and 15 carbons, inclusive, the weight ratio of alkylene oxide to condensation product falling between about 2:3 and 9:1, respectively, the phenol-formaldehyde condensation product being oxyalkylated with both ethylene oxide and propylene oxide, the weight ratio of propylene oxide to ethylene oxide being in the range of 1:9 to 9:1; and thereafter separating the water and the petroleum oil.

7. In a process for breaking petroleum oil emulsions, heating to a temperature between 150 and 200° F. and adding to a water-in-petroleum oil emulsion, the petroleum oil being a low gravity, high viscosity crude which is predominantly asphaltic base oils, a sufficient quantity to break the emulsion into its water and petroleum components of a surface-active, polyester condensation product of the following compounds, the percentages enumerated being calculated on a weight basis and totaling 100%: (a) 4–60% of a dicarboxylic acid and a terminally oxyethylated polyoxypropylene glycol, the polyoxypropylene glycol nucleus having a molecular weight in the range of 1,000 to 4.500, the ethylene oxide being adducted on said polyoxypropylene glycol in amounts in the range of 1 to 12 mols of ethylene oxide per mol of polyoxypropylene glycol, the partial ester resulting from esterification of 1 to 2 mols of dicarboxylic acid per mol of the oxyethylated polyoxypropylene glycol; (b) 6–36% of a monocarboxylic acid having at least six carbons; (c) 4–24% of a polycarboxy acid having at least eight carbons; (d) 15–60% of an ethylene oxide adduct of an alkali-insoluble, organic-solvent-soluble alkyl phenol-formaldehyde condensation product having about 4 to 15 phenolic nuclei, said alkyl group having 5–15 carbons, inclusive, said condensation product being oxyethylated at a weight ratio of ethylene oxide to condensation product of about 2:3 to 9:1, respectively; and (e) 15–60% of an oxyalkylated, alkali-insoluble, organic-solvent-soluble phenol - formaldehyde condensation product of a monoalkyl phenol having 4–15 phenolic nuclei, the alkyl group having between 5 and 15 carbons, inclusive, the weight ratio of alkylene oxide to condensation product falling between about 2:3 and 9:1, respectively, the phenol-formaldehyde condensation product being oxyalkylated with both ethylene oxide and propylene oxide, the weight ratio of propylene oxide to ethylene oxide being in the range of 1:9 to 9:1.

8. In a process for breaking petroleum oil emulsions, heating to a temperature between 150 and 200° F. and adding to a water-in-petroleum oil emulsion, the petroleum oil being a low gravity, high viscosity crude which is predominantly asphaltic base oils, a sufficient quantity to break the emulsion into its water and petroleum components of a surface active, polyester condensation product of the following compounds, the percentages enumerated being calculated on a weight basis and totaling 100%: (a) 4–60% of a partial ester of a dicarboxylic acid and a terminally oxyethylated polyoxypropylene glycol, the polyoxypropylene glycol nucleus having a molecular weight in the range of 1,000 to 4,500, the ethylene oxide being adducted on said polyoxypropylene glycol in amounts in the range of 1 to 12 mols of ethylene oxide per mol of polyoxypropylene glycol, the partial ester resulting from esterification of 1 to 2 mols of dicarboxylic acid per mol of the oxyethylated polyoxypropylene glycol; (b) a monocarboxylic acid having 11 to 18 carbons; (c) a dicarboxylic fatty dimer acid having 12 to 40 carbons; (d) 15–60% of an ethylene oxide adduct of an alkali-insoluble, organic-solvent-soluble alkyl phenol-formaldehyde condensation product having about 4 to 15 phenolic nuclei, said alkyl group having 5–15 carbons, inclusive, said condensation product being oxyethylated at a weight ratio of ethylene oxide to condensation product of about 2:3 to 9:1, respectively; and (e) 15–60% of an oxyalkylated, alkali-insoluble, organic-solvent-soluble phenol-formaldehyde condensation product of a monoalkyl phenol having 4–15 phenolic nuclei, the alkyl group having between 5 and 15 carbons, inclusive, the weight ratio of alkylene oxide to condensation product falling between about 2:3 and 9:1, respectively, the phenol-formaldehyde condensation product being oxyalkylated with both ethylene oxide and propylene oxide, the weight ratio of propylene oxide to ethylene oxide being in the range of 1:9 to 9:1.

9. In a process for breaking petroleum oil emulsions, heating to a temperature between 150 and 200° F. and adding to a water-in-petroleum oil emulsion, the petroleum oil being a low gravity, high viscosity crude which is predominantly asphaltic base oils, a sufficient quantity to break the emulsion into its water and petroleum components of a surface-active, polyester condensation product of the following compounds, the percentages enumerated being calculated on a weight basis and totaling 100%: (a) 4–60% of a partial ester of a dicarboxylic acid and a terminally oxyethylated polyoxypropylene glycol, the polyoxypropylene glycol nucleus having a molecular weight in the range of 1,000 to 4,500, the ethylene oxide being adducted on said polyoxypropylene glycol in amounts in the range of 1 to 12 mols of ethylene oxide per mol of polyoxypropylene glycol, the partial ester resulting from esterification of 1 to 2 mols of dicarboxylic acid per mol of the oxyethylated polyoxypropylene glycol; (b) 6–36% of a monocarboxylic acid having at least six carbons; (c) 4–24% of a dicarboxy acid having at least eight carbons; (d) 15–60% of an alkylene oxide adduct containing terminal oxyethylene groups of an alkali-insoluble, organic-solvent-soluble alkyl phenol-formaldehyde condensation product having about 4 to 15 phenolic nuclei, said alkyl group having 5–15 carbons, inclusive, said condensation product being oxyalkylated with alkylene oxides from the group consisting of ethylene oxide and both ethylene oxide and propylene oxide, in the latter instance the order of oxyalkylation being oxypropylation of the condensation product followed by oxyethylation of the oxypropylated condensation product at a weight ratio of total oxides to condensation product of about 2:3 to 9:1, respectively; and (e) 15–60% of an oxyalkylated, alkali-insoluble, organic-solvent-soluble phenol-formaldehyde condensation product of a monoalkyl phenol having 4–15 phenolic nuclei, the alkyl group having between 5 and 15 carbons, inclusive, the weight ratio of alkylene oxide to condensation product falling between about 2:3 and 9:1, respectively, the phenol-formaldehyde condensation product being oxyalkyl- ated with a premixture of ethylene oxide and propylene oxide, the weight ratio of propylene oxide to ethylene oxide being in the range of 1:9 to 9:1.

10. In a process for breaking petroleum oil emulsions, heating to a temperature between 150 and 200° F. and adding to a water-in-petroleum oil emulsion, the petroleum oil being a low gravity, high viscosity crude which is predominantly asphaltic base oils, a sufficient quantity to break the emulsion into its water and petroleum components of a surface active, polyester condensation product of the following compounds, the percentages enumerated being calculated on a weight basis and totaling 100%: (a) 4–60% of a partial ester of a dicarboxylic acid and a terminally oxyethylated polyoxypropylene glycol, the polyoxypropylene glycol nucleus having a molecular weight in the range of 1,000 to 4,500, the ethylene oxide being adducted on said polyoxypropylene glycol in amounts in the range of 1 to 12 mols of ethylene oxide per mol of polyoxypropylene glycol, the partial ester resulting from esterification of 1 to 2 mols of dicarboxylic acid per mol of the oxyethylated polyoxypropylene glycol; (b) a monocarboxylic acid having 11 to 18 carbons; (c) a dicarboxylic fatty dimer acid having 12 to 40 carbons; (d) 15–60% of an alkylene oxide adduct containing terminal oxyethylene groups of an alkali-insoluble, organic-solvent-soluble alkyl phenol-formaldehyde condensation product having about 4 to 15 phenolic nuclei, said alkyl group having 5–15 carbons, inclusive, said condensation product being oxyalkylated with alkylene oxides from the group consisting of ethylene oxide and both ethylene oxide and propylene oxide, in the latter instance the order of oxyalkylation being oxypropylation of the condensation product followed by oxyethylation of the oxypropylated condensation product at a weight ratio of total oxides to condensation product of about 2:3 to 9:1, respectively; and (e) 15–60% of an oxyalkylated, alkali-insoluble, organic-solvent-soluble phenol-formaldehyde condensation product of a monoalkyl phenol having 4–15 phenolic nuclei, the alkyl group having between 5 and 15 carbons, inclusive, the weight ratio of alkylene oxide to condensation product falling between about 2:3 and 9:1, respectively, the phenol-formaldehyde condensation product being oxyalkylated with a premixture of ethylene oxide and propylene oxide, the weight ratio of propylene oxide to ethylene oxide being in the range of 1:9 to 9:1.

References Cited in the file of this patent

UNITED STATES PATENTS

| | | |
|---|---|---|
| 2,354,993 | Harlan | Aug. 1, 1944 |
| 2,454,808 | Kirkpatrick et al. | Nov. 30, 1948 |
| 2,542,012 | De Groote et al. | Feb. 20, 1951 |
| 2,542,013 | De Groote et al. | Feb. 20, 1951 |
| 2,557,081 | De Groote et al. | June 19, 1951 |
| 2,562,878 | Blair | Aug. 7, 1951 |
| 2,574,538 | De Groote et al. | Nov. 13, 1951 |
| 2,581,380 | De Groote et al. | Jan. 8, 1952 |
| 2,606,882 | De Groote et al. | Aug. 12, 1952 |
| 2,681,894 | Hoenel | June 22, 1954 |
| 2,766,213 | Dickson | Oct. 9, 1956 |
| 2,950,299 | Kirkpatrick | Aug. 23, 1960 |

UNITED STATES PATENT OFFICE
CERTIFICATE OF CORRECTION

Patent No. 3,056,748                          October 2, 1962.

Earl Theodore Kocher

It is hereby certified that error appears in the above numbered patent requiring correction and that the said Letters Patent should read as corrected below.

Column 5, line 30, for "at" read -- as --; column 6, line 73, for "rection" read -- reaction --; column 10, line 6, for "polyoxypropyleene" read -- polyoxypropylene --; line 10, strike out "the"; column 14, line 36, for "4.500" read -- 4,500 --.

Signed and sealed this 26th day of March 1963.

(SEAL)
Attest:

ESTON G. JOHNSON                         DAVID L. LADD
Attesting Officer                             Commissioner of Patents